United States Patent
Miyake et al.

(10) Patent No.: US 7,296,206 B2
(45) Date of Patent: Nov. 13, 2007

(54) COMMUNICATION DEVICE, TRANSMISSION CONTROL METHOD, AND PROGRAM PRODUCT

(75) Inventors: Motoharu Miyake, Yokosuka (JP); Hiroshi Inamura, Yokohama (JP); Osamu Takahashi, Kunitachi (JP)

(73) Assignee: NTT DoCoMo, Inc., Tokyo (JP)

( * ) Notice: Subject to any disclaimer, the term of this patent is extended or adjusted under 35 U.S.C. 154(b) by 596 days.

(21) Appl. No.: 10/807,505

(22) Filed: Mar. 23, 2004

(65) Prior Publication Data

US 2005/0013246 A1 Jan. 20, 2005

(30) Foreign Application Priority Data

Mar. 25, 2003 (JP) ............................. 2003-124527

(51) Int. Cl.
*H04L 1/16* (2006.01)
(52) U.S. Cl. ..................................... 714/748; 714/749
(58) Field of Classification Search ................ 714/748, 714/749, 815
See application file for complete search history.

(56) References Cited

U.S. PATENT DOCUMENTS

| | | | | |
|---|---|---|---|---|
| 5,440,545 A * | 8/1995 | Buchholz et al. | ........... | 370/426 |
| 5,537,408 A * | 7/1996 | Branstad et al. | ........... | 370/473 |
| 5,563,879 A * | 10/1996 | Sanders et al. | ........... | 370/474 |
| 5,668,812 A * | 9/1997 | Akiyoshi | ................. | 370/474 |
| 5,706,425 A * | 1/1998 | Unekawa | ................. | 714/55 |
| 5,742,765 A * | 4/1998 | Wong et al. | ................. | 709/230 |
| 5,956,341 A * | 9/1999 | Galand et al. | ............... | 370/412 |
| 6,446,028 B1 * | 9/2002 | Wang | ........................ | 702/186 |
| 6,831,912 B1 * | 12/2004 | Sherman | ...................... | 370/349 |
| 6,888,835 B2 * | 5/2005 | Reeve | ................... | 370/395.52 |
| 6,975,647 B2 * | 12/2005 | Neale et al. | ................. | 370/466 |
| 7,116,634 B1 * | 10/2006 | Hanselmann | ............... | 370/219 |
| 2002/0150048 A1 | 10/2002 | Ha et al. | | |

FOREIGN PATENT DOCUMENTS

WO     WO 01/97438     12/2001

OTHER PUBLICATIONS

Chinese Office Action dated Apr. 21, 2006.

(Continued)

*Primary Examiner*—Stephen M. Baker
(74) *Attorney, Agent, or Firm*—Brinks Hofer Gilson & Lione

(57) ABSTRACT

The present invention provides a communication device, comprising: transmission means for transmitting a plurality of data segments via a packet communication network, each of the data segments including a sequence number, the data segments being transmitted in sequence number order; receiving means for receiving an acknowledgement indicating a data segment which the destination device requests the communication device to transmit next; retransmission means for changing a transmission rate and fro retransmitting one of the data segments in a case that the communication device has not received an acknowledgement including an acknowledgement number greater than a sequence number included in the retransmitted data segment when a predetermined time elapses following transmission of the original data segment; control means for determining a subsequent data segment to be transmitted next, and for controlling a transmission rate on the basis of a category of the acknowledgement and also information included in the acknowledgement.

8 Claims, 13 Drawing Sheets

OTHER PUBLICATIONS

Sarolahti, P. et al., "F-RTO: A TCP PTO Recovery Algorithm for Avoiding Unnecessary Retransmissions", *Internet Engineering Task Force, Internet Draft*, Jan. 2003, 11 Pages.

Allman, M. et al., "On Estimating End-to-End Network Path Properties", *ACM SIGCOMM'99*, vol. 29, No. 4, Oct. 1999, pp. 263-274 (11 Pages).

Sarolahti, P. et al., "F-RTO: A TCP RTO Recovery Algorithm for Avoiding Unnecessary Retransmissions" *I-D ACTION: draft-sarolahti-tsvwg-tcp-frto-03.txt*, Jan. 15, 2003, 2 Pages.

European Search Report dated Dec. 19, 2006.

Kumar, A., "Comparative Performance Analysis of Versions of TCP in a Local Network with a Lossy Link," IEEE/ACM Transactions on Networking, vol. 6, No. 4, Aug. 1, 1998.

* cited by examiner

FIG. 2

| SOURCE PORT NUMBER | | | DESTINATION PORT NUMBER |
|---|---|---|---|
| SEQUENCE NUMBER | | | |
| ACKNOWLEDGEMENT NUMBER | | | |
| DATA OFFSET | RESERVE | CONTROL FLAG | WINDOW |
| CHECKSUM | | | EMERGENCY POINTER |
| OPTION | | | PADDING |

FIG. 3

| TRANSMITTED DATA SEGMENT | | | | | | | | | | |
|---|---|---|---|---|---|---|---|---|---|---|
| ACKNOWLEDGEMENT RECEIVED | | | ACKNOWLEDGEMENT NOT RECEIVED | | | | | | | |
| 500 | 1000 | 1500 | 2000 | 2500 | 3000 | 3500 | 4000 | 4500 | 5000 | 5500 |

CONGESTION WINDOW send_una    2000
snd_max     3000
snd_nxt     3500
snd_cwnd    6MSS
snd_wnd     100MSS
sstresh     65535Bytes send_una    500
snd_max     2000
snd_nxt     2500
snd_cwnd    4MSS
snd_wnd     100MSS
sstresh     65535Bytes

COMMUNICATION DEVICE, TRANSMISSION CONTROL METHOD, AND PROGRAM PRODUCT

TECHNICAL FIELD

The present invention relates to a communication device for controlling retransmission of data in a communication network.

RELATED ART

Communication systems utilizing TCP (Transmission Control Protocol) are in widespread use. In such systems, a device such as a server device can be used to divide data into a plurality of data segments, with each data segment including a header containing a sequence number for identifying the segment. The server device transmits to a client device data segments in order of their sequence number. When the client device receives a data segment from the server device, the client device transmits to the server device an acknowledgment of the received data segment. The acknowledgement includes an acknowledgment number which indicates a sequence number of a data segment to be transmitted next. In this way, a server device communicating under TCP is able to confirm receipt of transmitted data segments.

However, in the communication routine outlined above it is possible that a data segment transmitted from a server device may not be received by a client device. In other words, the segment may be lost en route to the client device (hereinafter, "data segment loss"). If a data segment loss occurs, the client device will not transmit an acknowledgement of receipt of the segment to the server. To avoid excessive communication delay in conducting communication under TCP, a predetermined time value is set as a timeout value from transmission of a data segment from a server device to receipt of an acknowledgement corresponding to the transmitted data segment at the transmitting device (hereinafter, "retransmission timeout"). If a retransmission timeout occurs it is assumed that a transmitted data segment has been lost, and the data segment is therefore retransmitted.

As stated above, an acknowledgement for a data segment includes an acknowledgment number which indicates a sequence number of a data segment to be transmitted next. In the following description, in addition to the term "retransmission timeout" explained above, the term "retransmission timeout" is used to refer to retransmission of a data segment upon occurrence of a retransmission timeout.

By using the method outlined above for communication under TCP, in which a subsequent data segment is transmitted after receipt of an acknowledgement corresponding to a prior data segment, it is possible to enhance communication reliability. However, this method gives rise to a problem in that it tends to cause deterioration in a data transmission rate. One solution employed to overcome this problem is for a TCP server device to transmit a plurality of data segments without waiting for receipt of an acknowledgement; and to sequentially increase a number of data segments that are continuously transmitted each time the sever device receives an acknowledgement corresponding to a transmitted data segment. This method for transmitting data segments is referred to as "window control" and the number of data segments continuously transmitted is referred to as "congestion window size". When a retransmission timeout occurs under window control, the sever device retransmits the lost data segment and decreases the congestion window size to a minimum value. The server device increases the congestion window size in accordance with a predetermined algorithm (for example, slow start algorithm and congestion avoidance algorithm) each time the server device receives an acknowledgement corresponding to the transmitted data segment. This is aimed at preventing congestion deterioration which would otherwise be caused by a large number of data segments flowing into communication network. The slow start algorithm is an algorithm by which the congestion window size is increased exponentially, whereas the congestion avoidance algorithm is an algorithm by which the congestion window size is increased linearly. A process for increasing the congestion window size in accordance with the slow start algorithm is referred to as "slow start process" and a process for increasing the congestion window size in accordance with the congestion avoidance algorithm is referred to as "congestion avoidance process". Generally, a communication device conforming to TCP performs the slow start process before the congestion window size reaches a given threshold, and performs the congestion avoidance process after the congestion window size exceeds the given threshold.

A mobile packet communication system is a communication system conforming to TCP as described above. Such a mobile communication system includes a wireless communication path between a mobile packet communication network and a client device. In such a system if deterioration in a radio wave environment occurs, a transmitted data segment may remain suspended in a mobile packet communication system for a relatively long time. In a case that the radio wave environment recovers after a retransmission timeout has occurred, the suspended data segment is received by the client device.

In this case, the client device receives both the suspended data segment (hereinafter referred to as "original data segment") and the retransmitted data segment. The client device transmits to the server device two acknowledgements: one corresponding to the original data segment and the other to the retransmitted data segment. However, there is no difference between these two acknowledgements except for the timing of their transmission. Therefore, when the server device receives the first acknowledgement, it is not possible for the server device to identify whether the acknowledgment corresponds to the original data segment or to the retransmitted data segment. In the prior art, it is assumed that the acknowledgement corresponds to the retransmitted data segment and that the original data segment has been lost. Based on such an assumption, the server device retransmits data segments subsequent to the suspended data segment despite the fact that the data segment has been received by the client device.

As described above, in a case involving retransmission following timeout, the prior art has the following problems. That is, in the prior art deterioration in throughput occurs because the prior art needs a certain time to recover a congestion window size in accordance with each of the slow start algorithm and the congestion avoidance algorithm. Furthermore, in the prior art an increase in network traffic is caused by retransmission of a data segment which has been already received by the client device.

SUMMARY OF THE INVENTION

The present invention is aimed at solving the problems of the prior art stated above. In other words, the present invention allows appropriate control of a transmission rate without increasing an amount of information, without decreasing a transmission rate inappropriately, and without carrying out unnecessary retransmission of data segments.

The present invention provides A communication device, comprising: transmission means for transmitting a plurality of data segments to a destination device via a packet communication network, each of the plurality of data segments including a sequence number, the plurality of data segments being transmitted in sequence number order; receiving means for receiving an acknowledgement indicating a data segment to be received next; retransmission means for changing a transmission rate, and for retransmitting one of the plurality of data segments in a case that the communication device has not received an acknowledgement including an acknowledgement number greater than a sequence number included in the one of the plurality of data segments when a predetermined time elapses following transmission of the one of the plurality of data segments by the transmission means; control means for determining a subsequent data segment to be transmitted next, and for controlling a transmission rate on the basis of a category of the acknowledgement and information included in the acknowledgement, to transmit the subsequent data segment.

In a preferred embodiment, the retransmission means retransmits again the one of the plurality of data segments when the reception means receives a predetermined number of acknowledgements all of which include the same acknowledgement number after the one of the plurality of data segments is retransmitted. The control means may update the transmission rate on the basis of a transmission rate at a point in time immediately before the predetermined time elapses, in a case that the reception means receives an acknowledgement including an acknowledgement number subsequent to a maximum sequence number included in data segments which have already been transmitted.

In another preferred embodiment, the retransmission means retransmits again the one of the plurality of data segments when the reception means receives a predetermined number of selective acknowledgements all of which include the same acknowledgement number after the one of the plurality of data segments is retransmitted, the selective acknowledgement further including selective acknowledgment information for identifying received data segments, the one of the plurality of data segments being identified by the selective acknowledgment information.

In another preferred embodiment, the control means updates the transmission rate on the basis of a transmission rate at a point in time immediately before the predetermined time elapses, in a case that the reception means receives an acknowledgement including an acknowledgement number equal to a sequence number which is a predetermined number greater than a sequence number included in the one of the plurality of data segments retransmitted by the retransmission means.

In another preferred embodiment, the retransmission means may retransmit again the one of the plurality of data segments, in a case that the reception means receives an acknowledgement including an acknowledgement number greater than a sequence number which is a predetermined number greater than a sequence number included in the one of the plurality of data segments retransmitted by the retransmission means. The control means may update the transmission rate to be less than a transmission rate at a point in time immediately before the predetermined time elapses, in a case that the reception means receives an acknowledgement including an acknowledgement number subsequent to a maximum sequence number included in data segments which have already been transmitted.

In another preferred embodiment, The control means may updates the transmission rate to be less than a transmission rate at a point in time immediately before the predetermined time elapses, in a case that the reception means receives an acknowledgement including an acknowledgement number equal to a sequence number which is a predetermined number greater than a sequence number included in the one of the plurality of data segments retransmitted by the retransmission means.

The present invention also provides a transmission control method, comprising the steps of: transmitting a plurality of data segments to a destination device via a packet communication network, each of the plurality of data segments including a sequence number, the plurality of data segments being transmitted in sequence number order; receiving an acknowledgement indicating a data segment which the destination device requests the communication device to transmit next; changing a transmission rate and retransmitting one of the plurality of data segments in a case that the communication device has not received an acknowledgement including an acknowledgement number greater than a sequence number included in the one of the plurality of data segments when a predetermined time duration elapses since the one of the plurality of data segments is transmitted by the transmitting step; determining a subsequent data segment to be transmitted next, and for controlling the transmission rate on the basis of a category of the acknowledgement and information included in the acknowledgement, to transmit the subsequent data segment.

The present invention also provides a program product for causing a computer to execute the transmission control method.

BRIEF DESCRIPTION OF THE DRAWINGS

Preferred embodiments of the present invention will be described in detail based on the following figures, wherein:

FIG. 2 illustrates a data structure of data segments communicated by the packet communication under TCP;

FIG. 3 is a diagram illustrating the interrelations of these six parameters;

BEST MODE FOR CARRYING OUT THE INVENTION

Figure 1:
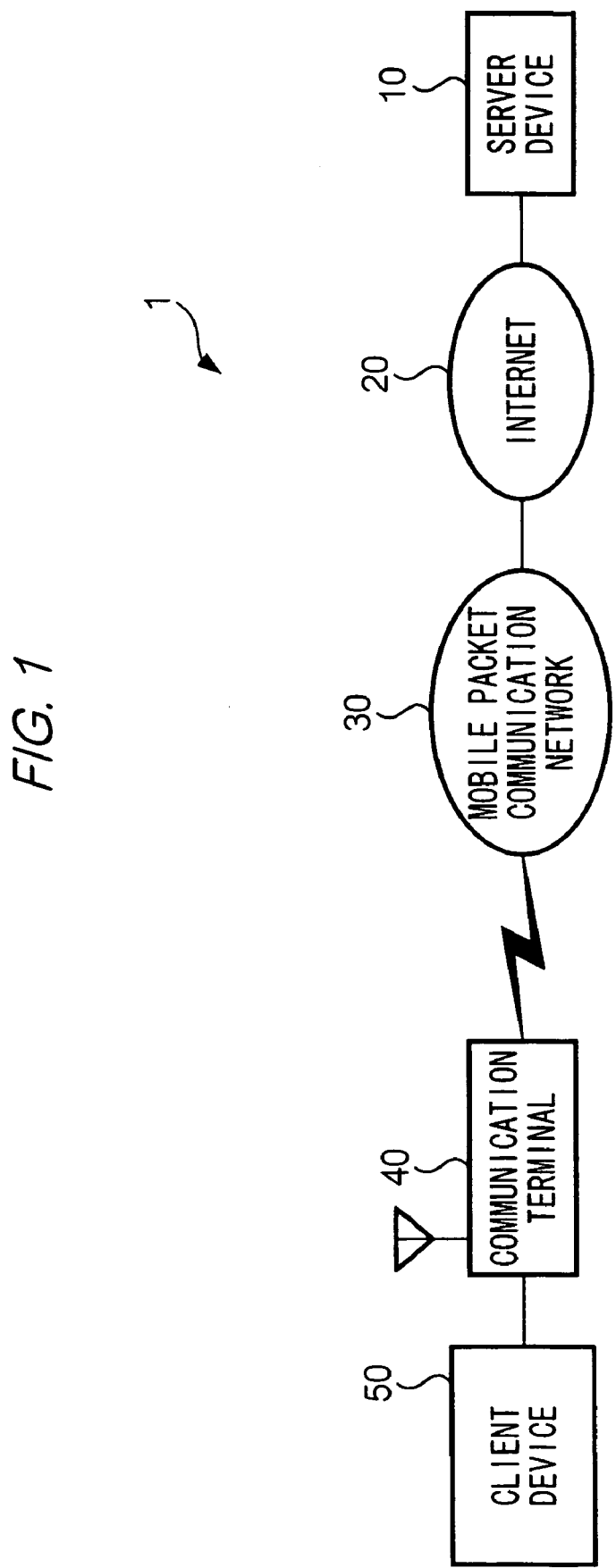
FIG. 1 is a block diagram illustrating a configuration of Communication System 1 in accordance with the first embodiment of the present invention.

Preferred embodiments of the present invention will now be described in detail with reference to the drawings. Throughout the drawings, those entities which have the same function are denoted by the same reference numerals respectively.

1. FIRST EMBODIMENT 1-1. Configuration of Communication System 1

FIG. 1 is a block diagram illustrating a configuration of communication system 1 in accordance with the first embodiment of the present invention. Communication terminal 40 is connected to client device 50 and performs packet communication with client device 50. Mobile packet communication network 30 provides packet communication services to communication terminal 40 which is served by mobile packet communication network 30. Server device 10 performs packet communication with client device 50 via Internet 20, mobile packet communication network 30, and communication terminal 40. In the embodiment, server device 10 performs packet communication with client device 50 under TCP, thereby transmitting data segments.

1-2. Packet Communication under TCP

Prior to the description of the embodiment, packet communication under TCP will be described. FIG. 2 illustrates a data structure of data segments communicated by the packet communication under TCP. In this description, the source and the destination of data segments are server device 10 and client device 50, respectively. Each data segment has a header including a sequence number which indicates an order of the data segment in the data sequence. Server device 10 transmits to client device 50 a plurality of data segments in sequence number order. Client device 50 transmits an acknowledgment in response to the received data segment. The acknowledgement includes a header containing an acknowledgment number which indicates a sequence number of a data segment which client device 50 expects to receive next.

Server device 10 estimates that data segment loss has occurred and retransmits a lost data segment when each of the following two conditions is satisfied. The first condition is an elapse of a predetermined time (hereinafter referred to as "retransmission timeout duration") without receiving from client device 50 an acknowledgment corresponding to a transmitted data segment since the server device 10 transmitted the data segment. The second condition is to receive a predetermined number of (for example, three) acknowledgements all of which have the same acknowledgement number. These acknowledgments are referred to as "duplicate acknowledgments". The retransmission of a data segment in accordance with the second condition does not depend on a retransmission timeout. Namely, if server device 10 receives three duplicate acknowledgements, server device 10 immediately retransmits a data segment corresponding to the same acknowledgement number. The retransmission in accordance with the second condition is referred to as "fast retransmission" because the retransmission is performed without waiting for elapse of a retransmission timeout duration.

Further, to ensure reliability, TCP has two control mechanisms for controlling data transmission rate in response to a communication state of a network as well as retransmission of a lost data segment. One is "congestion control" and the other is "flow control". In general, flow control refers to control of a transmission rate in response to a destination (client device 50 in the embodiment); and congestion control refers to control of a transmission rate in response to a network communication state. Each of these control mechanisms performed by server device 10 will now be described in detail below.

Server device 10 stores at least six parameters, snd_max, snd_nxt, snd_una, snd_wnd, snd_cwnd, and sstresh. Congestion control is performed by transmitting a number of data segments identified on the basis of those parameters. FIG. 3 is a diagram illustrating the interrelations of these six parameters. snd_max shows a sequence number (for example, sequence number "3000" in FIG. 3) of a data segment including the maximum sequence number among data segments that have already been transmitted. snd_nxt shows a sequence number (for example, sequence number "3500" in FIG. 3) of a data segment to be transmitted or retransmitted next. snd_una shows the least recent unacknowledged sequence number (for example, sequence number "2000" in FIG. 3) among data segments that have already been transmitted. snd_cwnd shows a number of data segments that may be transmitted by server device 10 without receipt of an acknowledgement for previously transmitted data segments. Namely, snd_cwnd represents a "congestion window size" and is a value controlled by server device 10. In contrast, snd_wnd represents an advertised window size notified from a client device 50; and the value of the advertised window size indicates an available buffer receiving space of client device 50, and is represented in bytes. Server device 10 employs a minimum of advertised window size snd_wnd and congestion window size snd_cwnd as a window size for transmission, on the basis of which window control is performed. Consequently, a transmission window size never exceeds an advertised window size, and a number of data segments transmitted to client device 50 never exceeds an available buffer space of client device 50. Sever device 10 performs the flow control by setting the parameter snd_wnd to the advertised window size Server device 10 performs congestion control by updating congestion window size snd_cwnd to an appropriate value. One data segment is represented in a unit called Maximum Segment Size (hereinafter referred to as "MSS"), where the default size of 1 MSS is determined as 512 bytes; and snd_cwnd has, for example, 1 MSS as its initial value. Server device 10 increases a value of snd_cwnd in accordance with a slow start algorithm where a number of data segments transmitted is incremented exponentially until the value reaches a predetermined threshold sstresh (e.g., 65,535 bytes) each time an acknowledgement for a transmitted data segment is received. When the value of snd_cwnd reaches the threshold sstresh, server device 10 increases the value of snd_cwnd linearly in accordance with the congestion avoidance algorithm until it is detected that a data segment has been lost and has not reached client device 50.

When server apparatus 10 detects a data segment loss, server apparatus 10 decreases the transmission rate by updating the value of sstresh and snd_cwnd. Specifically, the value of sstresh is set to the half of the value of sstresh when the data segment loss was detected. Furthermore, the congestion window size is minimized, namely, the value of snd_cwnd is set to 1 MSS. The operation after the update differs depending on whether the data segment loss is detected by retransmission timeout or by duplicate acknowledgements.

In a case that data segment loss is detected by retransmission timeout, server device 10 updates the value of snd_nxt with the value of snd_una and retransmits a data segment which has a sequence number of the value of snd_nxt. Then, server apparatus 10 increases congestion window size snd_cwnd using the above mentioned slow start algorithm each time an acknowledgement for a retransmitted data segment is received.

In a case that data segment loss is detected by duplicate acknowledgements, server device 10 retransmits the lost data segment in accordance with the fast retransmission described above.

Furthermore, in a case that server device 10 conforms to the fast recovery algorithm, server device 10 updates the value of snd_cwnd with the half value of snd_cwnd when data segment loss is detected. Then, server apparatus 10 increases congestion window size snd_cwnd using the above-mentioned slow start control algorithm each time an acknowledgement for a retransmitted data segment is received. Using the congestion window size snd_cwnd, sever device 10 transmits a data segment subsequent to a data segment which includes a maximum sequence number among data segments which have been already transmitted.

1-3. Configuration of Server Device 10

Figure 4:
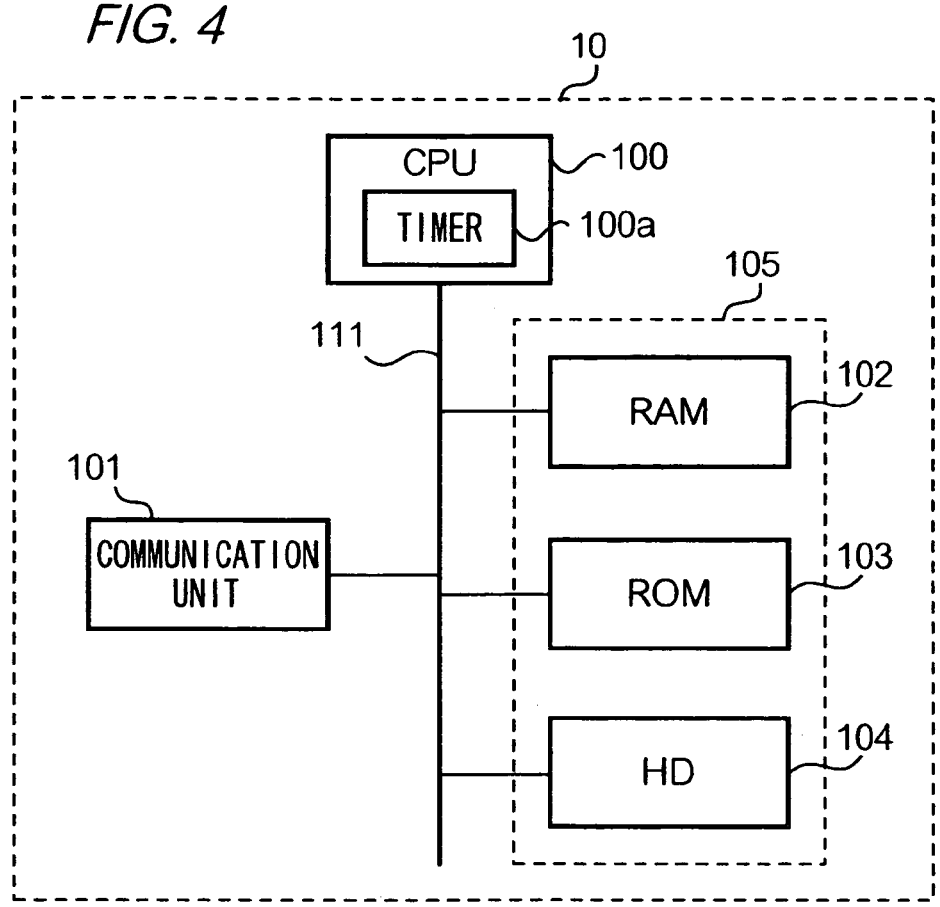
FIG. 4 is a block diagram illustrating a configuration of server device 10 in accordance with the first embodiment.

Next, description will be given of a configuration of server device 10. Server device 10 is configured in the same way as a standard computer, and therefore, only those components relating to the present embodiment will be described with reference to FIG. 4.

CPU 100 executes a program stored in storage unit 105, thereby controlling each component of server device 10. CPU 100 comprises timer 100a, which outputs a trigger signal when a predetermined time set by CPU 100 has elapsed. In the embodiment, timer 100a outputs a trigger signal when the retransmission timeout duration has elapsed. Storage unit 105 comprises RAM (Random Access Memory) 102, ROM (Read Only Memory) 103, and HDD (Hard Disk Drive) 104. ROM 103 stores a program for causing CPU 100 to control data segment transmission. CPU 100 controls data segment transmission in the following way.

When server device 10 receives an acknowledgement including an acknowledgement number which is the same as a sequence number of an data segment retransmitted after a retransmission timeout, CPU 100 estimates that the acknowledgement corresponds to the retransmitted data segment. It is further estimated that some data segments have reached client device 50 and some data has not reached client device 50. Here, if sever device 10 receives duplicate acknowledgements, server device 10 retransmits a data segment including a sequence number which is the same as that of the lost data segment, in accordance with the fast retransmission described above. When server device 10 receives an acknowledgment which indicates that all of the lost data segments have been received by client device 50, server device 10 starts transmitting data segments from a data segment subsequent to a data segment which has a maximum sequence number within data segments which have already been transmitted. The value of snd_cwnd is set to a value stored immediately before detecting a retransmission timeout. Thus, server device 10 can transmit data segments at a transmission rate at the point in time immediately before detecting timeout.

1-4. Operation

Operations of communication system 1 in accordance with the present embodiment will be described in this section.

Figure 5:
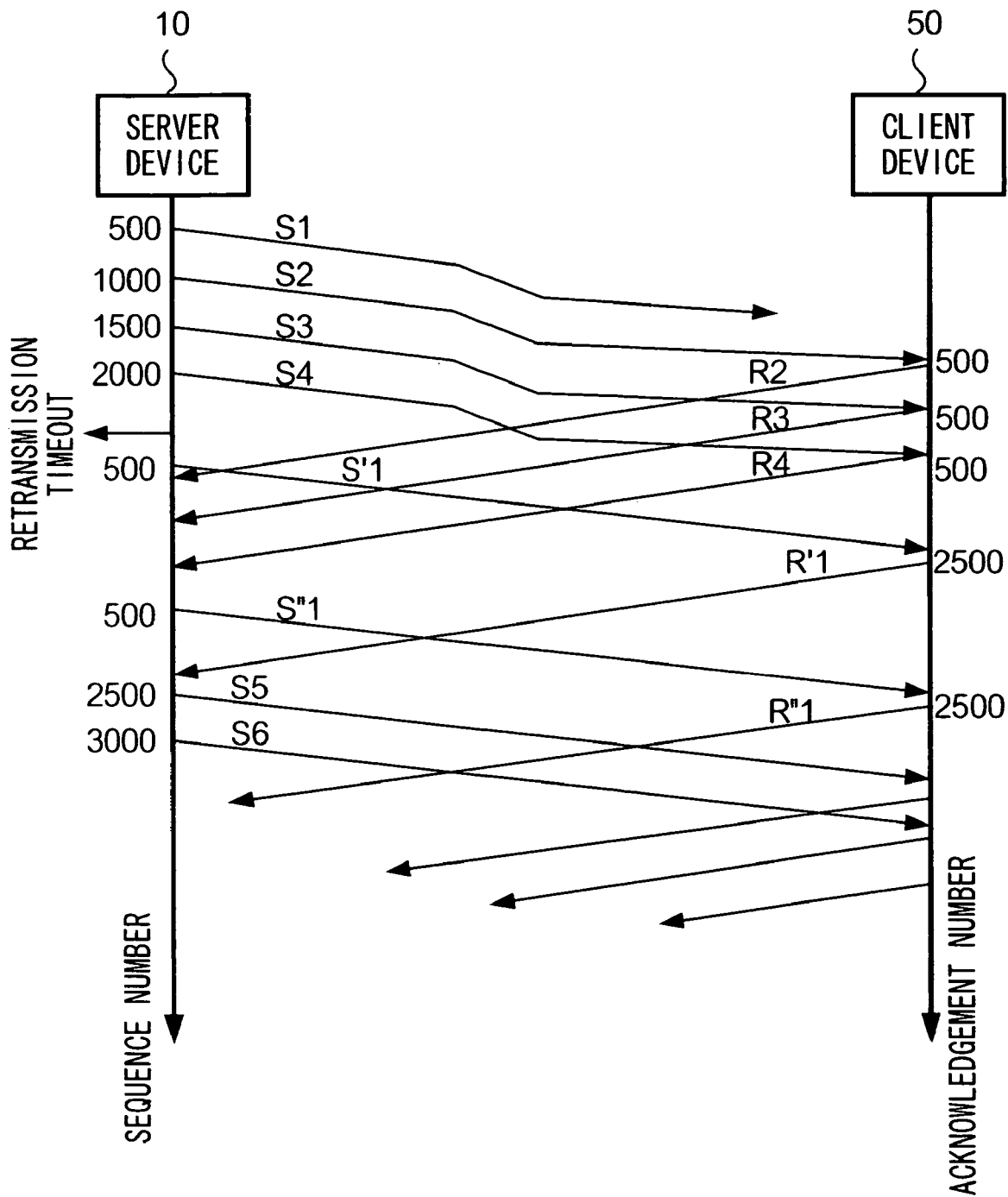
FIG. 5 is a sequence chart illustrating an operation of packet communication between server device 10 and client device 50 in accordance with the first embodiment.
Figure 6:
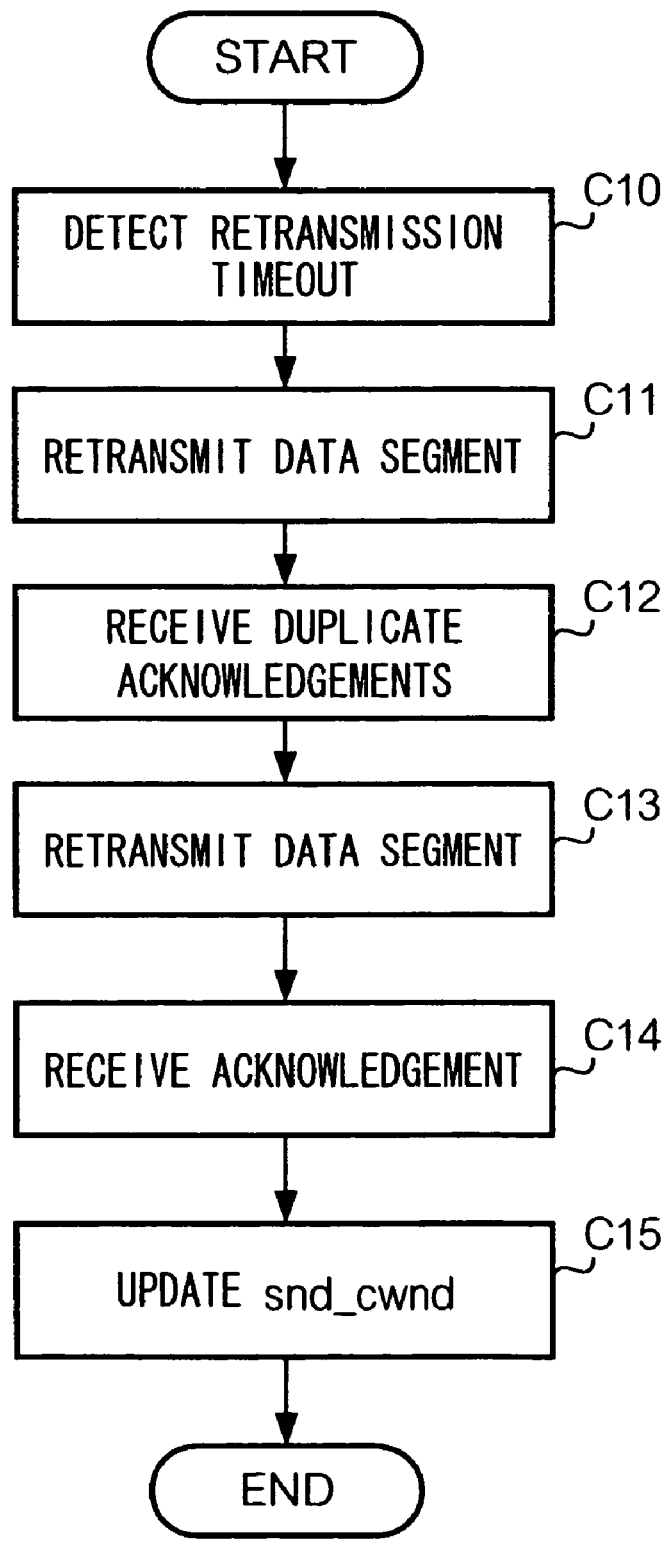
FIG. 6 is a flow chart illustrating an operation of packet communication in server device 10 in accordance with the first embodiment.

FIG. 5 is a sequence chart illustrating an operation of packet communication between server device 10 and client device 50. FIG. 6 is a flow chart illustrating an operation of packet communication in server device 10 in accordance with the present embodiment.

In the present embodiment, the congestion window size snd_cwnd is initially set to 4 MSS. First, server device 10 transmits to client device 50 data segments which have a sequence number of "500", "1000", "1500", and "2000", respectively. Hereinafter, these data segments are referred to as "original data segments" S1-S4, respectively.

In a case that original data segment S1 is lost and does not reach client device 50, and that original data segments S2-S4 are suspended in transmission before reaching client device 50 due to communication disruption, original data segments S2-S4 are subsequently received by client device 50 after communication is recovered. Thus, the time required for original data segments S2-S4 to reach client device 50 is delayed.

When client device 50 receives original data segment S2, client device 50 transmits to server device 10 acknowledgment R2 which includes an acknowledgement number "500" indicating that client device 50 requests receipt of original data segment S1.

After original data segments S3 and S4 are sequentially received by client device 50, client device 50 transmits to server device 10 acknowledgements R3 and R4 for original data segments S3 and S4, respectively. These acknowledgements R3 and R4 also include a sequence number "500".

Then, server device 10 receives these acknowledgements R2-R4 sequentially.

Now, description will be given of operations performed by server device 10 described above with reference to FIG. 6.

Figure 7:
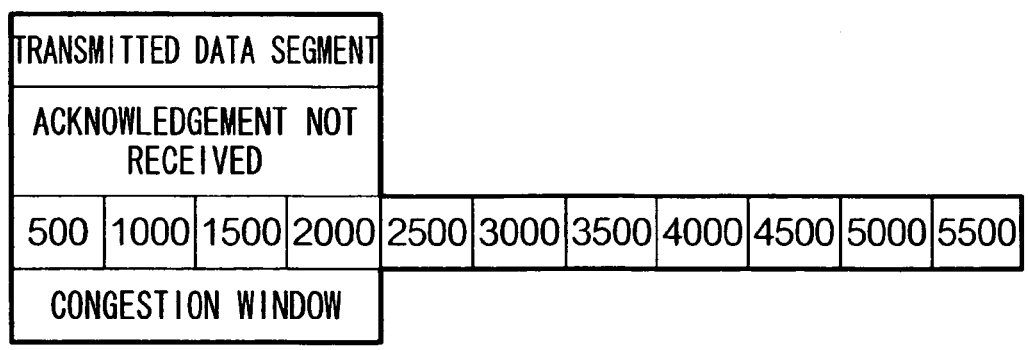
FIG. 7 is a schematic diagram for description of the congestion window.

CPU 100 of server device 10 transmits original data segments S2-S4. CPU 100 can control parameters described above, as shown in FIG. 7. At this point in time, the values of snd_una, snd_max, snd_nxt, snd_cwnd, snd_wnd, and sstresh are "500", "2000", "2500", "4 MSS", "100 MSS", and "65535 bytes", respectively.

After transmitting the data segments, CPU 100 waits for an acknowledgment for original data segment S1. In waiting for the acknowledgement, CPU 100 sets the retransmission timeout duration at timer 100a to cause timer 100a to measure an elapsed time CPU 100 then determines whether any acknowledgment is received. When it is determined "No", CPU 100 then determines whether the retransmission timeout by timer 100a occurs. In a case that it is determined "No" in the latter determination, the routine returns to the former determination. The determinations are repeated by CPU 100 before the retransmission timeout occurs as far as no acknowledgement is received.

It is assumed here that the elapsed time reaches the retransmission timeout duration before server device 10 receives acknowledgement R2 because data segment S1 has been lost and the arrival of data segments S2 and S3 is delayed. Namely, it is assumed that CPU 100 detects the retransmission timeout (step C10). In this case, CPU 100 estimates that all of the original data segments S1-S4 have been lost without reaching client device 50. Consequently, CPU 100 resets timer 100a and updates the value of sstresh and snd_cwnd in accordance with the congestion control algorithm described above. Specifically, the value of sstresh is updated to "2 MSS", which is half of the value of snd_cwnd, "4 MSS". Furthermore, the value of send_cwnd is updated to "1 MSS", which is a minimum value of window size, in response to the retransmission timeout. CPU 100 stores the previous value of send_cwnd, "4 MSS" in RAM 102.

CPU 100 retransmits to client device 50 a data segment (retransmitted data segment S'1 in FIG. 5) which has a sequence number of "500" (step C11).

CPU 100 then determines whether any acknowledgment is received, and in a case that it is determined "No", CPU 100 then determines whether a timeout by timer 100a occurs. When the latter determination is "No," the routine returns to the former determination. After that, the determinations are repeated by CPU 100 before a timeout occurs as far as no acknowledgement is received.

When server device 10 receives acknowledgement R2 (step C12), CPU 100 determines that the received acknowledgement R2 is a duplicate acknowledgement and that acknowledgement R2 corresponds to the retransmitted data segment. Thus, it is estimated that not all of the transmitted data segments have been lost and that some of the transmitted data segments have been received by client device 50.

When sever device 10 receives acknowledgement R3 and R4, CPU 100 performs the fast retransmission described above. CPU 100 then retransmits to client device 50 a data segment (retransmitted data segment S"1 in FIG. 5) including a sequence number "500" (step C13).

The above operations are described in FIG. 5 as follows. That is, in server device 10, retransmitted data segment S'1 is transmitted due to the occurrence of the retransmission timeout, then acknowledgements R2 to R4 are received, and finally retransmitted data segment S"1 is transmitted in accordance with the fast retransmission. On the other hand, in client device 50, retransmitted data segment S'1 is received, and acknowledgement R'1 including an acknowledgement number "2500" which indicates an data segment to be received next.

Referring to FIG. 6 again, when sever device 100 receives acknowledgement R'1 (step C14), CPU 100 determines that all of the transmitted data segments which have sequence numbers "500", "1000", "1500", and "2000" have been received by client device 50. Consequently, CPU 100 updates (step C15) the value of the congestion window size snd_cwnd with the value stored in RAM 104 which is a value of snd_cwnd at a point in time immediately before the retransmission timeout. In the present embodiment, the congestion window size snd_cwnd is updated from "1 MSS" to "2 MSS", which is half of the stored value "4 MSS". Furthermore, the value of the threshold sstresh is updated to the same value as snd_cwnd. In the present embodiment, the value of snd_cwnd is updated to "2 MSS". The number of data segments to be transmitted is two. Then, CPU 100 transmits to client device 50 two data segments including sequence numbers "2500" and "3000". As shown in FIG. 5, server device 10 transmits to client device 50 original data segments S5 and S6.

Server device 10 controls the transmission rate for transmitting data segments to client device 50 as described above.

According to the present embodiment, an amount of redundant retransmission can be reduced because server device 10 retransmits only those data segments which have not been received by client device 50.

In the prior art, a transmission rate subject to a greater reduction than is necessary since after a retransmission timeout is detected the window size is reduced to the minimum value in accordance with the slow start algorithm. On the contrary, in the invention according to the present embodiment, the congestion window size snd_cwnd is updated on the basis of a value of snd_cwnd at a point in time immediately before timeout. Therefore, server device 10 can transmit data segments at an appropriate transmission rate even after a retransmission timeout has occurred.

2. SECOND EMBODIMENT

The present embodiment relates to packet communication using SACK (Selective Acknowledgement) option. To avoid redundancy, description of those components that are the same as the ones described in the first embodiment will be omitted. Also, like components will be denoted using like reference numerals.

SACK information is a type of information for notifying server device 10 of a data segment which is received after a data segment is lost and does not reach client device 50. SACK information is included in an option field in an header described in FIG. 2. For example, SACK information "SACK=1500_2999" indicates that data segments including sequence numbers from 1500 to 2999 have been received by client device 50.

Generally, operations in accordance with the present embodiment are as follow: Server device 10 retransmits a data segment after a retransmission timeout. When server device 10 receives duplicate acknowledgements including an acknowledgement number which is the same as a sequence number of the retransmitted data segment and also including a SACK information, sever device 10 performs fast retransmission described above, and retransmits a lost data segment identified by the SACK information. After that, when server device 10 receives an acknowledgement showing that all of the lost data segments have been received by client device 50, CPU 100 updates the value of the congestion window size snd_cwnd to a value of snd_cwnd at a point in time immediately before the retransmission timeout. Therefore, a transmission rate for data segments is set to that at a point in time immediately before timeout.

ROM 103 of server device 10 stores a transmission control program for causing server device 10 to perform these operations.

Figure 8:
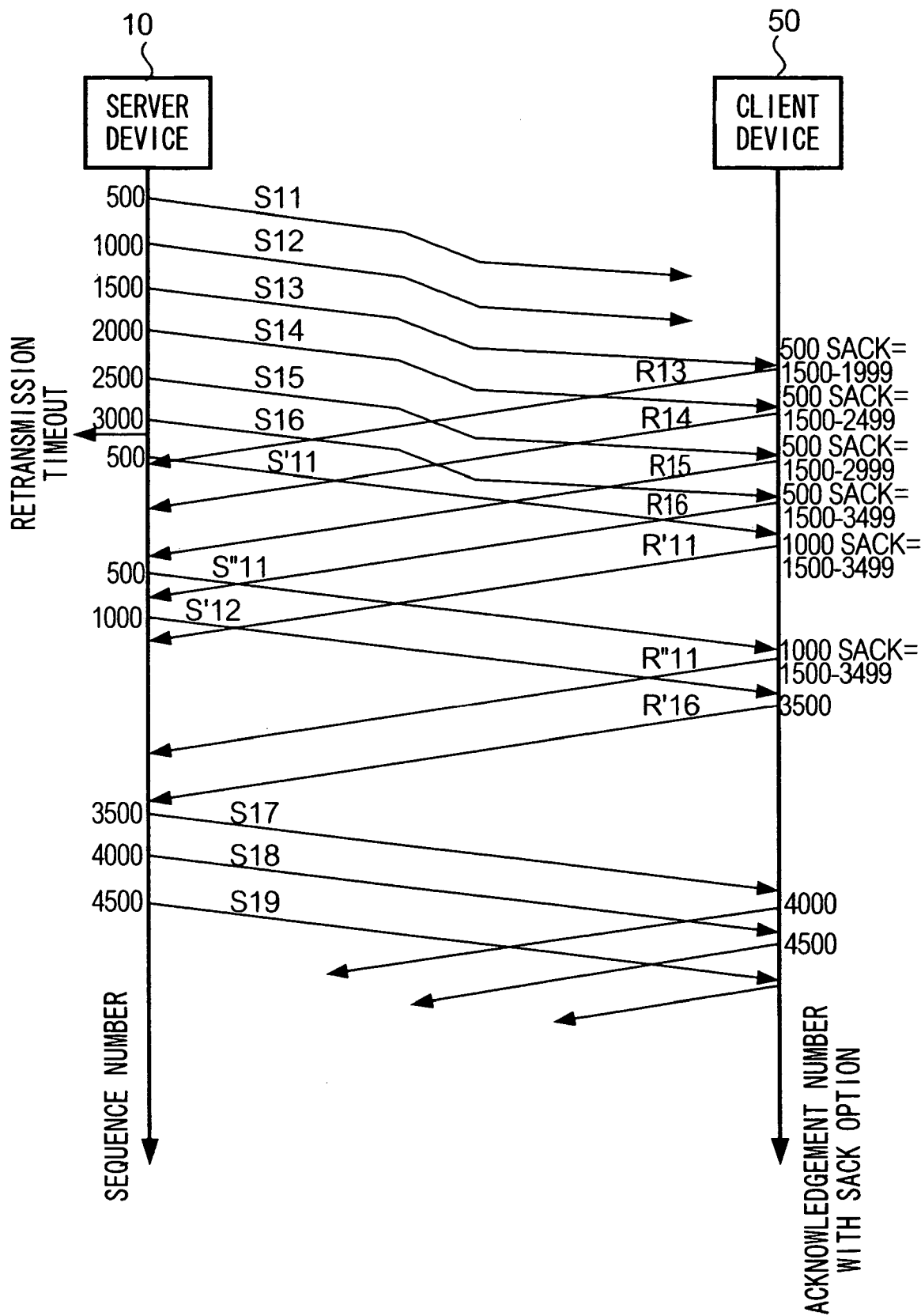
FIG. 8 is a sequence chart illustrating operations of packet communication between server device 10 and client device 50 in accordance with the second embodiment of the present invention.
Figure 9:
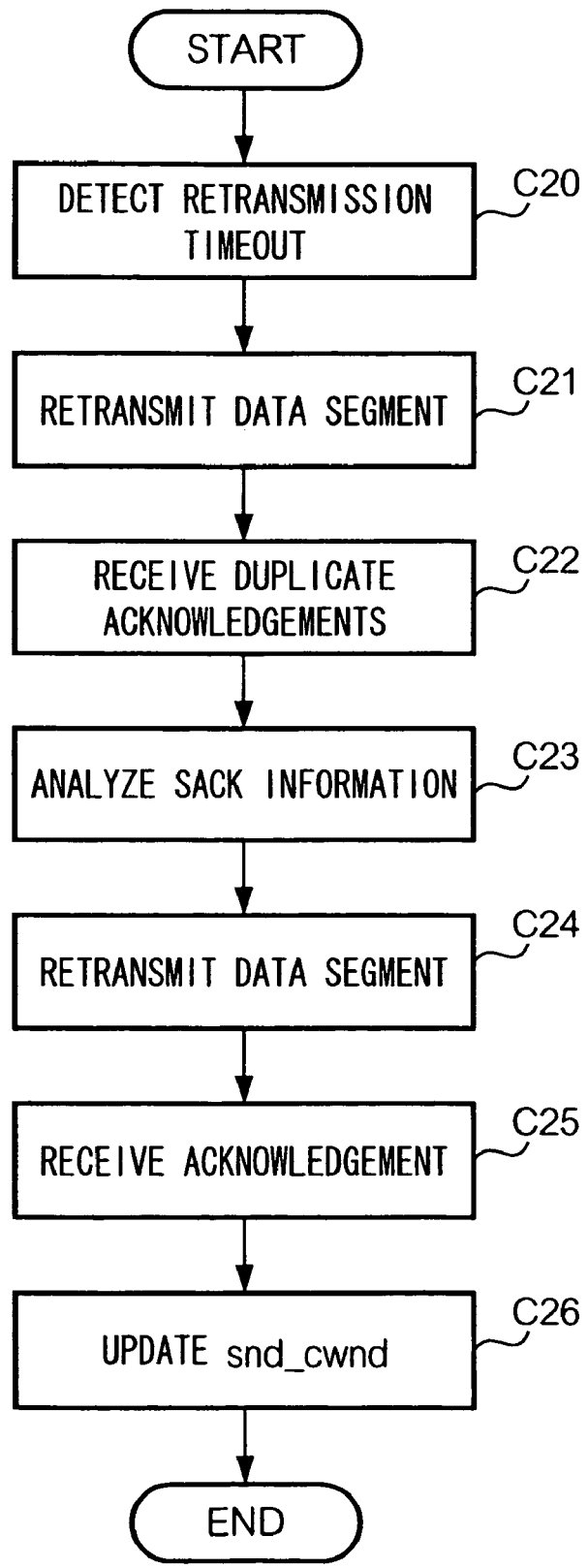
FIG. 9 is a flow chart illustrating operations of packet communication in server device 10 in accordance with the second embodiment.

FIG. 8 is a sequence chart illustrating operations of packet communication between server device 10 and client device 50. FIG. 9 is a flow chart illustrating operations of packet communication in server device 10. As stated, like components are denoted by like reference numerals. Description of the same steps as in the first embodiment will be described using the same reference numerals.

In the present embodiment, the congestion window size is initially set to 6 MSS. As shown in FIG. 8, server device 10 transmits to client device 50 data segments which have a sequence number of "500", "1000", "1500", "2000", "2500", and "3000", respectively. Hereinafter, these data segments are referred to as "original data segments" S11-S16, respectively. Here, it is assumed that original data segments S11 and S12 have been lost and have not reached client device 50 and original data segments S13-S16 are received by client device 50 sequentially after some delay.

In this case, when client device 50 receives original data segment S13, client device 50 transmits to server device 10 acknowledgement R13 corresponding to original data segment S13. Acknowledgement R13 includes an acknowledgement number "500" which is the same as a sequence number of original data segment S11. Also, acknowledgement R13 includes a SACK information "SACK=1500_1999" indicating that original data segment S13 has been received by client device 50. After that, when client device 50 receives original data segments S14-S16, client device 50 sequentially transmits to server device 10 acknowledgement R14-R16, each of which corresponds to original data segments S14-S16, respectively. All of these acknowledgements R14-R16 also include an acknowledgement number "500", which is the same as a sequence number of original data segment S11. Also, acknowledgement R14, R15, and R16 include SACK information "SACK=1500_2499", "SACK=1500_2999", and "SACK=1500_3499", respectively.

Thus, server device 10 receives these acknowledgements R13-R16 sequentially.

Now, description will be given of operations performed by server device 10 described above with reference to FIG. 9.

CPU 100 of server device 10 transmits original data segments S11-S16. At this point in time, the value of the congestion window size snd_cwnd and threshold sstresh are set to "6 MSS" and "65535 bytes", respectively.

In the present embodiment, original data segments S1 and S2 are lost and have not reached client device 50, while original data segments S14-S16 have been received by client device 50 after some delay. Consequently, an elapsed time reaches the retransmission timeout duration; namely, CPU 100 detects a retransmission timeout (step C20). In this case, CPU 100 retransmits (step C21) a data segment (retransmitted data segment S'11) including a sequence number "500". Client device 50 receives retransmitted data segment S'11 and transmits to server device 10 acknowledgement R13 in response to data segment S'11. When server device 10 receives acknowledgement R13, CPU 100 estimates that the retransmitted data segments has been received by client device 50.

CPU 100 receives (step C22) duplicate acknowledgements (acknowledgements R13-R15) each of which include an acknowledgement number "500". In the present embodiment, these acknowledgements also include SACK information, and CPU 100 determines (step C24) a data segment to be transmitted next on the basis of the SACK information. For example, when server device 10 receives acknowledgements including SACK information "SACK=1500_2499", "SACK=1500_2999", and "SACK=1500_3499", CPU 100 determines that data segments to be retransmitted next are data segments including a sequence number "500" and "1000", that is, original data segment S11 and S12. The congestion window size is set to 1 MSS and CPU 100 then retransmits (step C24) to client device 50 a data segment including a sequence number "500" (retransmitted data segment S"11 in FIG. 8) in accordance with the fast retransmission. After that, when server device 10 receives acknowledgement R16, CPU retransmits (step C24) a data segment including a sequence number "1000" (retransmitted data segment S'12 in FIG. 8).

When client device 50 receives retransmitted data segment S'12, all of the transmitted data segments have been received. Consequently, client device 50 transmits to server device 10 an acknowledgement (acknowledgement R'16 in FIG. 8). Acknowledgement R'16 includes an acknowledgement number "3500" which corresponds to a data segment subsequent to the transmitted data segments. Acknowledgement R'16 includes no SACK information because all of the lost data segments have been received by client device 50.

When server device 10 receives acknowledgement R'16 (step C25), CPU 100 updates (step C26) the value of the congestion window size snd_cwnd to a value of snd_cwnd at a point in time immediately before timeout, which is similar to the case in the first embodiment. Subsequently, CPU 100 sets the value of snd_cwnd to half the value of snd_cwnd, and updates the value of sstresh to the value of snd_cwnd. In the present embodiment, the value of snd_cwnd is updated from "6 MSS" to "3 MSS" and the value of sstresh is updated to "3 MSS". At this point in time, the congestion window size, namely, the number of data segments to be transmitted is three. Thus, CPU 100 transmits to client device 50 three data segments which have sequence numbers "3500", "4000", and "4500" (data segments S17-S19 in FIG. 8).

3. THIRD EMBODIMENT

The present embodiment relates to another example of packet communication using the SACK option.

In the present embodiment, server device 10 does not perform fast retransmission in response to duplicate acknowledgements. This is different from the second embodiment. General operations in accordance with the present embodiment are as follow. That is, when server device 10 receives an acknowledgement including an acknowledgement number which is the same as a sequence number of a retransmitted data segment and also including SACK information after having retransmitted to client device 50 a data segment including the sequence number, CPU 100 estimates that the transmitted data segments have been received by client device 50. Namely, server device 10 estimates that some data segments have been received by client device 50 and some data segments have been lost without reaching client device 50. CPU 100 then determines a data segment to be transmitted next, on the basis of a sequence number included in the retransmitted data segment after timeout and SACK information included in the received acknowledgement. Then, CPU 100 updates the value of the congestion window size snd_cwnd on the basis of the value of snd_cwnd at the point in time immediately before timeout. Therefore, a transmission rate for data segments is set to that immediately before timeout.

Figure 10:
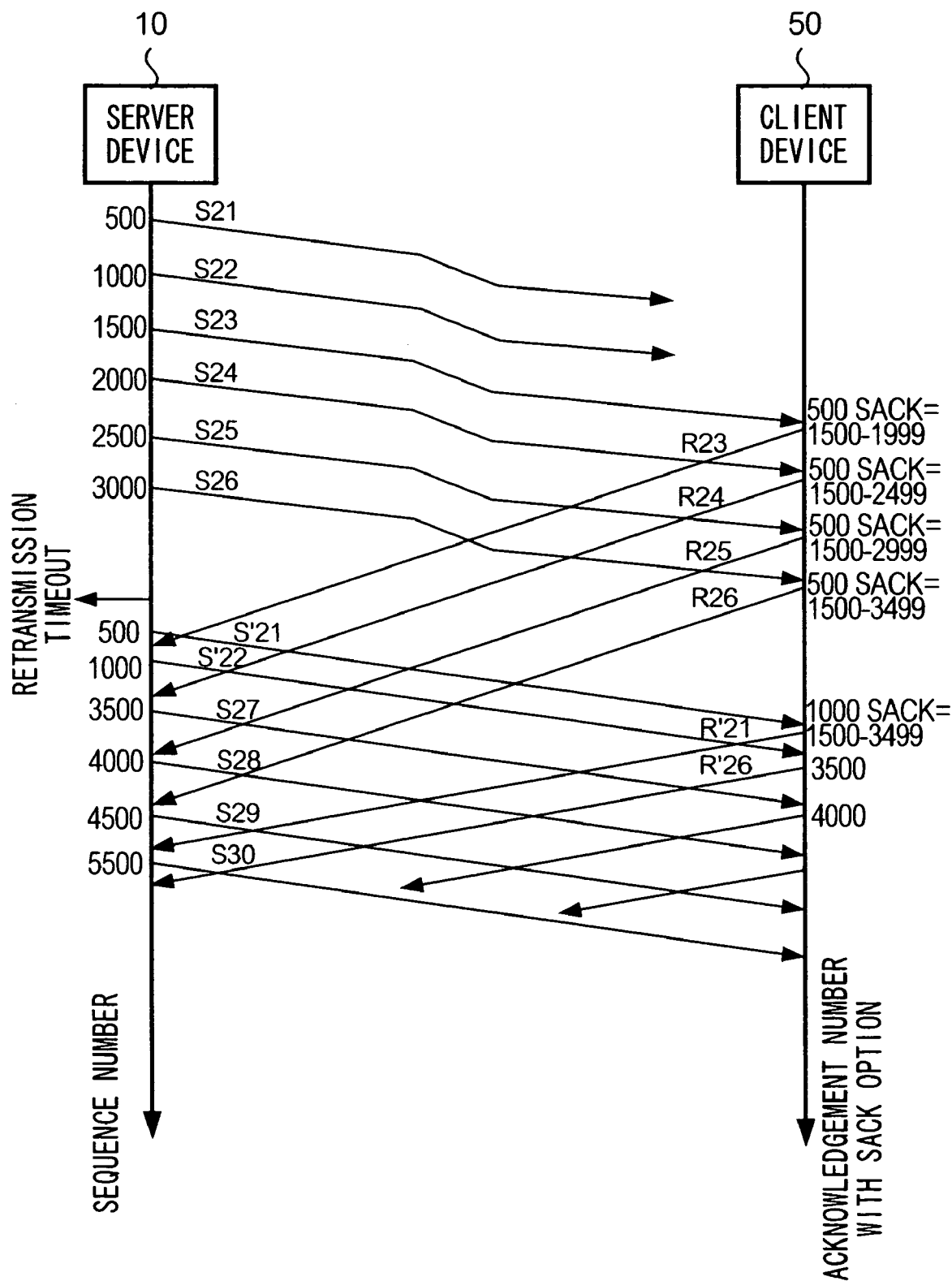
FIG. 10 is a sequence chart illustrating operations of packet communication between server device 10 and client device 50 in accordance with the third embodiment of the present invention.
Figure 11:
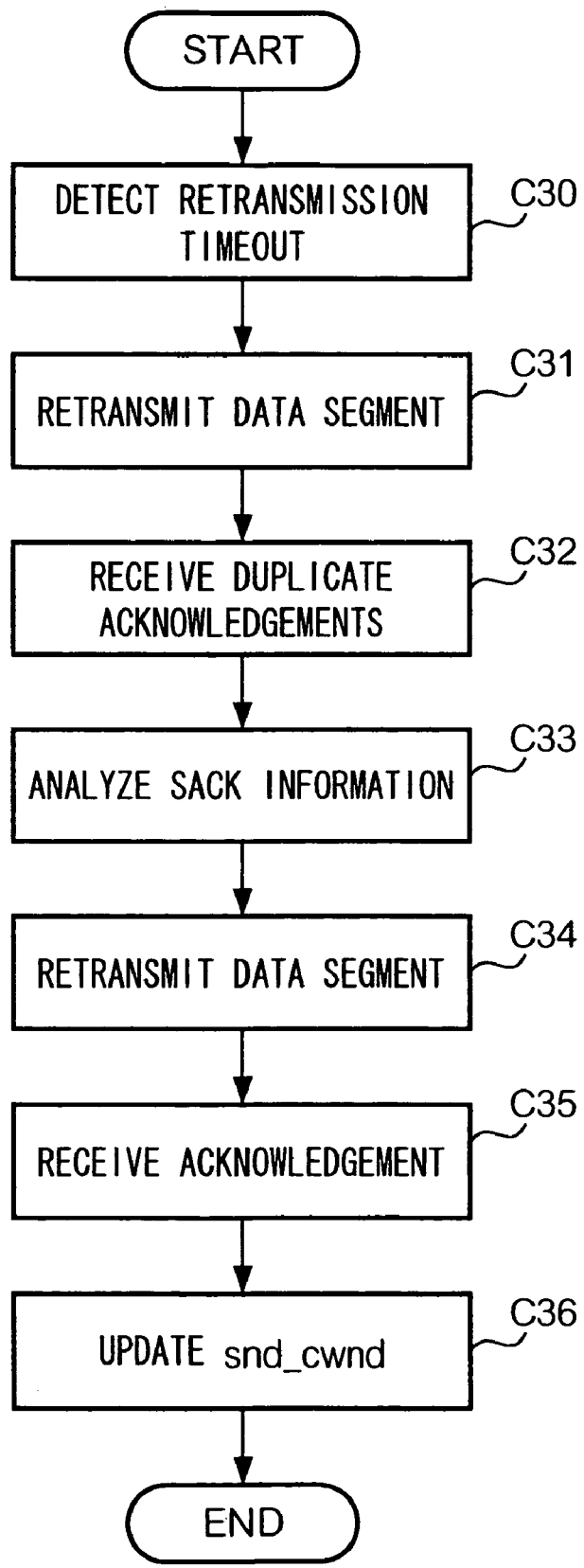
FIG. 11 is a flow chart illustrating operations of packet communication in server device 10 in accordance with the third embodiment.

FIG. 10 is a sequence chart illustrating operations of packet communication between server device 10 and client device 50. FIG. 11 is a flow chart illustrating operations of packet communication in server device 10 in accordance with the present embodiment.

In the present embodiment, the congestion window size is initially set to 6 MSS. As shown in FIG. 10, server device 10 transmits to client device 50 data segments which have a sequence number of "500", "1000", "1500", "2000", "2500", and "3000", respectively. Hereinafter, these data segments are referred to as "original data segments" S21-S26, respectively. Here, it is assumed that original data segments S21 and S22 have been lost without reaching client device 50 and that original data segments S23-S26 are received by client device 50 sequentially after some delay.

In this case, client device 50 transmits to sever device 10 acknowledgements R23-R26 including SACK information, which is similar to the case in the second embodiment.

These acknowledgements R23-R26 are received by server device 10 sequentially after some delay, because the arrival of original data segments S23-S26 at client device 50 is delayed.

Therefore, CPU 100 of server device 10 detects (step C30) the retransmission timeout for an acknowledgement corresponding to a data packet including a sequence number "500", and retransmits (step C31) a data segment including a sequence number "500" (retransmitted data segment S'21 in FIG. 10). After the detection of the retransmission timeout, the value of the threshold sstresh and the congestion window size snd_cwnd are "3 MSS" and "1 MSS", respectively. The value of sstresh "65535 bytes" and snd_cwnd "6 MSS" at a point in time immediately before timeout are stored in RAM 102.

When CPU 100 receives (step C32) acknowledgement R23 including an acknowledgement number "500", CPU 100 performs the following operations.

First, CPU 100 analyzes (step C33) SACK information included in acknowledgement R23. Because in this case the SACK information is "SACK=1500_1999", CPU 100 estimates that original data segment S23 has been received by client device 50. Further, based on the SACK information, CPU 100 estimates that original data segments S21 and S22, each of which has a sequence number less than 1500, have been lost and have not reached client device 50. Consequently, CPU 100 retransmits original data segment S22 because original data segment S21 has already retransmitted (retransmitted data segment S'21). Namely, CPU 100 retransmits a data segment including a sequence number "1000" (retransmitted data segment S'22 in FIG. 10).

When CPU 100 receives acknowledgement R24 including an acknowledgement number "500" and SACK information "SACK=1500_2499", CPU 100 retransmits a data segment subsequent to the previous retransmitted data segment, which is similar to the case in receiving acknowledgement R23. Thus, CPU 100 retransmits a data segment subsequent to the previous retransmitted data segment whenever CPU 100 receives an acknowledgement until? receiving an acknowledgement including a sequence number "3500" which corresponds to a data segment to be transmitted next.

When CPU 100 receives an acknowledgement (acknowledgement R'26 in FIG. 10) including an acknowledgement number "3500", CPU 100 updates the value of the threshold sstresh and the congestion window size snd_cwnd to those at a point in time immediately before timeout, which are stored in RAM 102. CPU 100 further updates the value of sstresh and snd_cwnd on the basis of the value stored in RAM 102. For example, the value of snd_cwnd is updated to "3 MMS" which is half of the stored value "6 MSS". Also, the value of sstresh is updated to "3 MMS", the same value as snd_cwnd.

Thus, CPU 100 controls transmission rate for packet communication on the basis of the transmission rate at the point in time immediately before the retransmission timeout.

4. FOURTH EMBODIMENT

The present embodiment relates to packet communication using a delayed acknowledgment algorithm.

In packet communication using to a delayed acknowledgment algorithm, client device 50 which receives a data segment suspends transmission of an acknowledgement. In the present embodiment, client device 50 transmits an acknowledgement corresponding to two data segments, which is referred to as "delayed acknowledgement". That is, when client device 50 receives two data segments sequentially, client device 50 transmits an acknowledgement including a sequence number which indicates a data segment subsequent to the latter of the two received data segments. In a case that a predetermined time elapses after receiving the former data segment, client device 50 transmits to server device 10 an acknowledgement corresponding to only one data segment.

When server device 10 receives a delayed acknowledgement, CPU 100 estimates that two previous data segments to a data segment including a sequence number which is the same as the acknowledgement number have been received by client device 50.

In the following description of the present embodiment, acknowledgement number A denotes an acknowledgement number included in an acknowledgement received after having retransmitted a data segment; sequence number B denotes a sequence number included in a data segment to be transmitted second in line after the retransmitted data segment (i.e., B="1500" when a data segment including a sequence number "500" has retransmitted.); and sequence number C denotes a maximum sequence number among data segments which have been already transmitted.

General operations in accordance with the present embodiment are as follow. That is, when server device 10 receives an acknowledgement including acknowledgement number A, CPU 100 first determines whether A is greater than B or equal to B. If A is greater than B, CPU 100 further determines whether A is equal to C. In a case that A is equal to B, namely, A=B, it is estimated that the retransmission timeout is caused by minor congestion and that no data segment has been lost and has not reached client device 50. Then, CPU 100 updates the value of the congestion window size snd_cwnd with the stored value of snd_cwnd at a point in time immediately before the timeout. Thus, server device 10 sets the transmission rate for packet communication on the basis of that at a point in time immediately before timeout.

In a case that A is greater than B, namely, A>B, it is estimated that serious deterioration such as (a) loss of data segments or acknowledgement or (b) reverse of arrival order, has occurred. Then, CPU 100 updates the value of the congestion window size snd_cwnd to the half of the stored value of snd_cwnd at a point in time immediately before the timeout. Thus, server device 10 sets the transmission rate for packet communication to be less than that at a point in time immediately before timeout.

Thus, sever device 10 controls the transmission rate for transmitting data segments.

4-1. First Example of Operation

Figure 12:
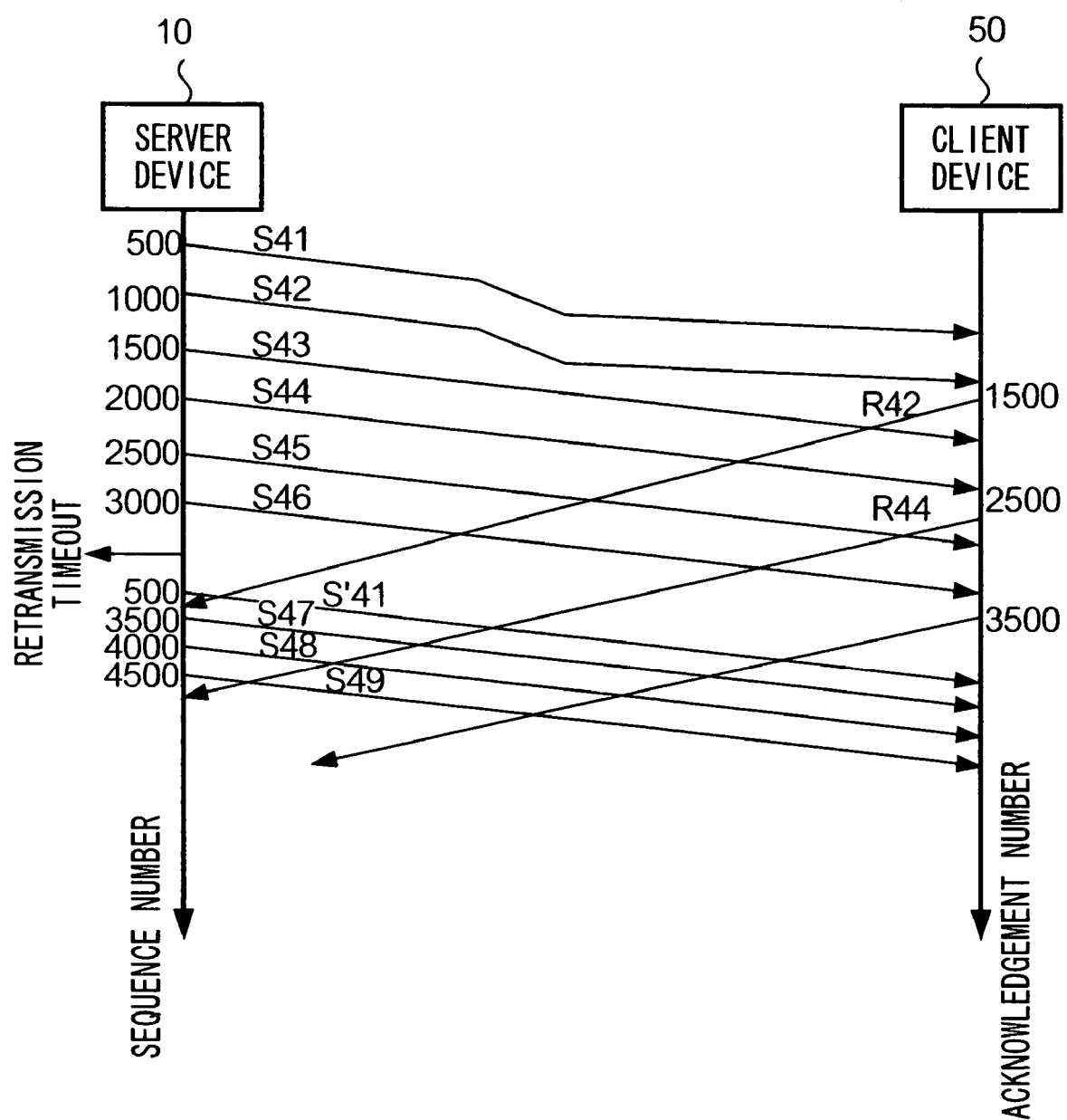
FIG. 12 is a sequence chart illustrating operations of packet communication between server device 10 and client device 50 in accordance with the fourth embodiment of the present invention.
Figure 13:
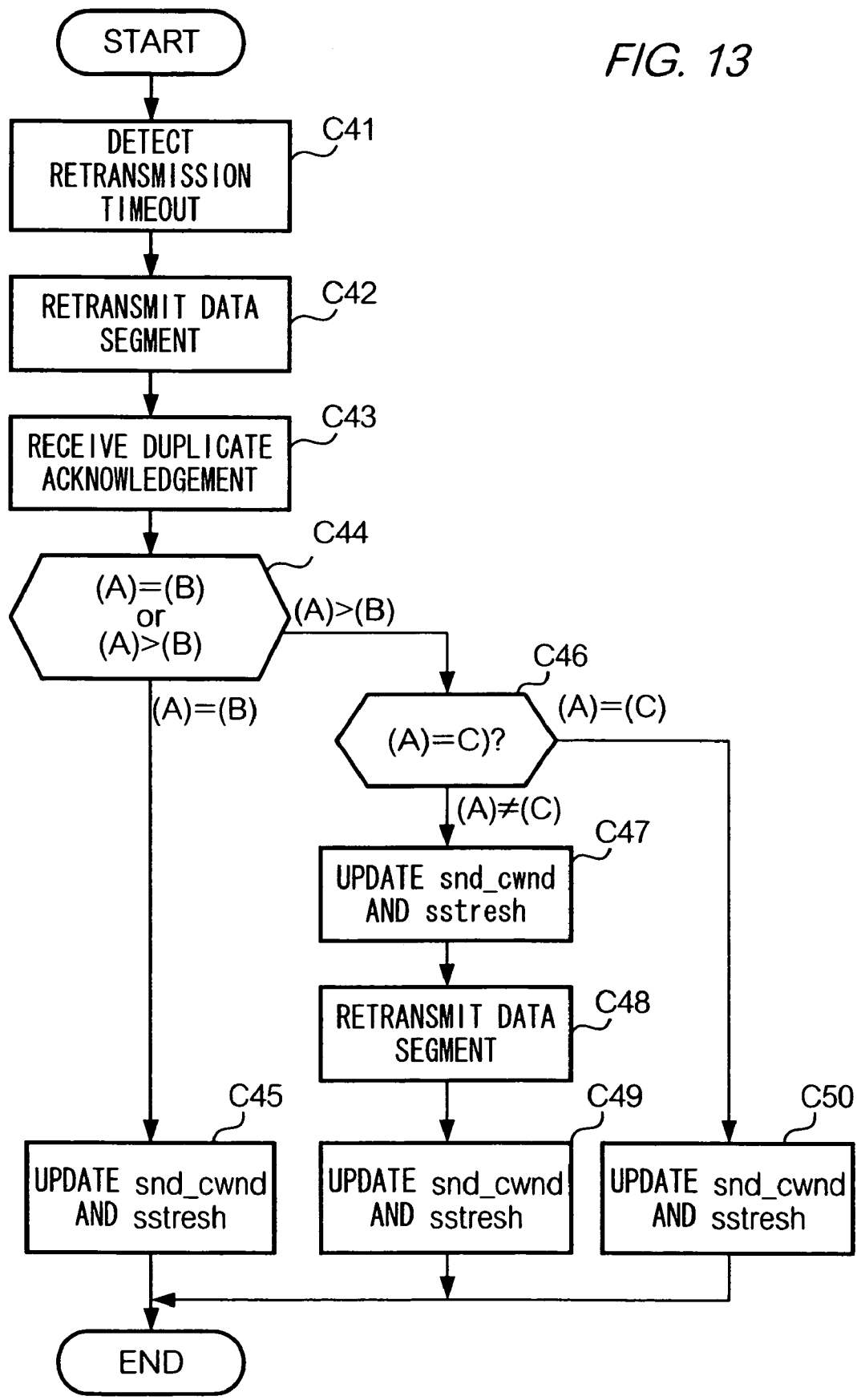
FIG. 13 is a flow chart illustrating operations of packet communication in server device 10 in accordance with the fourth embodiment.

FIG. 12 is a sequence chart illustrating operations of packet communication between server device 10 and client device 50 in accordance with the present embodiment. FIG. 13 is a flow chart illustrating operations of packet communication in server device 10.

In the present example, the congestion window size is initially set to 6 MSS. As shown in FIG. 12, server device 10 transmits to client device 50 data segments which have a sequence number of "500", "1000", "1500", "2000", "2500", and "3000", respectively. Hereinafter, these data segments are referred to as "original data segment" S41-S46, respectively. Here, it is assumed that original data segments S41 and S42 have been received by client device 50 after some delay and original data segments S43-S46 are received by client device 50 normally.

When client device 50 receives original data segments S41 and S42, client device 50 transmits acknowledgement R42 corresponding to these two data segments. Acknowledgement R42 includes an acknowledgement number "1500", which is the same as a sequence number included in a data segment subsequent to original data segment S42. It is further assumed here that server device 10 detects the retransmission timeout because server device 10 receives acknowledgement R42 after some delay.

Now, description will be given of operations performed by server device 10 described above with reference to FIG. 13.

CPU 100 of server device 10 transmits original data segment S41-S46. At this point in time, the value of the congestion window size snd_cwnd and threshold sstresh are "6 MSS" and "65535 bytes", respectively.

When CPU 100 detects the retransmission timeout for original data segment S41, CPU 100 estimates that original data segment S41 has been lost without reaching client device 50. Then, CPU 100 resets timer 100a and updates the value of the threshold sstresh and the congestion window size snd_cwnd in accordance with the congestion control algorithm described above. In the present embodiment, the value of sstresh is updated to "3 MSS" which is half the value of snd_cwnd, and the value of snd_cwnd is updated with the minimum value, "1 MSS". The value of sstresh "65535 bytes" and snd_cwnd "6 MSS" at a point in time immediately before timeout are stored in RAM 102.

Then, CPU 100 retransmits (step C42) to client device 50 a data segment (retransmitted data segment S'41) including a sequence number "500".

When CPU 100 receives (step C43) acknowledgement R42, CPU 100 makes a determination based on acknowledgement number A, sequence number B, and sequence number C. In this example, A, B, and C are 1500, 1500, and 3500, respectively.

First, CPU 100 determines whether A is equal to B or A is greater than B. In this example, CPU 100 determines that A is equal to B.

Consequently, it is estimated that acknowledgement R42 corresponds to original data segments S41 and S42. Namely, it is estimated that no data segment has been lost and that original data segment S41 and S42 have been received by client device 50. Therefore, CPU 100 determines that it is not necessary for server device 10 to reduce a transmission rate. At step C45, CPU 100 updates the value of snd_cwnd and sstresh to those at a point in time immediately before the timeout, stored in RAM 102. In the present embodiment, the value of the congestion window size snd_cwnd is updated from "1 MSS" to "6 MSS", and the value of the threshold sstresh is also updated from 3 MSS to 65535 bytes. Thus, the transmission rate for packet communication is updated so as to be equal to the transmission rate at a point in time immediately before timeout. Subsequently, CPU 100 increases the value of snd_cwnd from 6 MSS to 7 MSS. At this point in time, the congestion window size is 7 MSS, the number of data segments which have already transmitted is seven, and acknowledgements corresponding to three of seven transmitted data segments have been received by server device 10. The number of data segment which is able to be transmitted next is three. This is because acknowledgements corresponding to the remaining four data segments have not been received by server device 10.

CPU 100 transmits to client device 50 three data segments subsequent to data segment S37, which has already transmitted. In the present example, CPU 100 transmits three data segments (original data segments S47 and S48 in FIG. 11) including sequence number 3500, 4000, and 4500 respectively.

In the prior art, the value of snd_cwnd and sstresh are not updated to the value at a point in time immediately before timeout. The value of snd_cwnd and sstresh are maintained as 1 MSS and 3 MSS, respectively. Although no data segment loss has occurred, the number of data segments to be transmitted next, namely, the window size, is set to 1 MSS, which is the minimum value. On the contrary, the window size is not set to be inappropriately narrow, since the value of snd_cwnd and sstresh are appropriately updated.

4-2. Second Example of Operation

Figure 14:
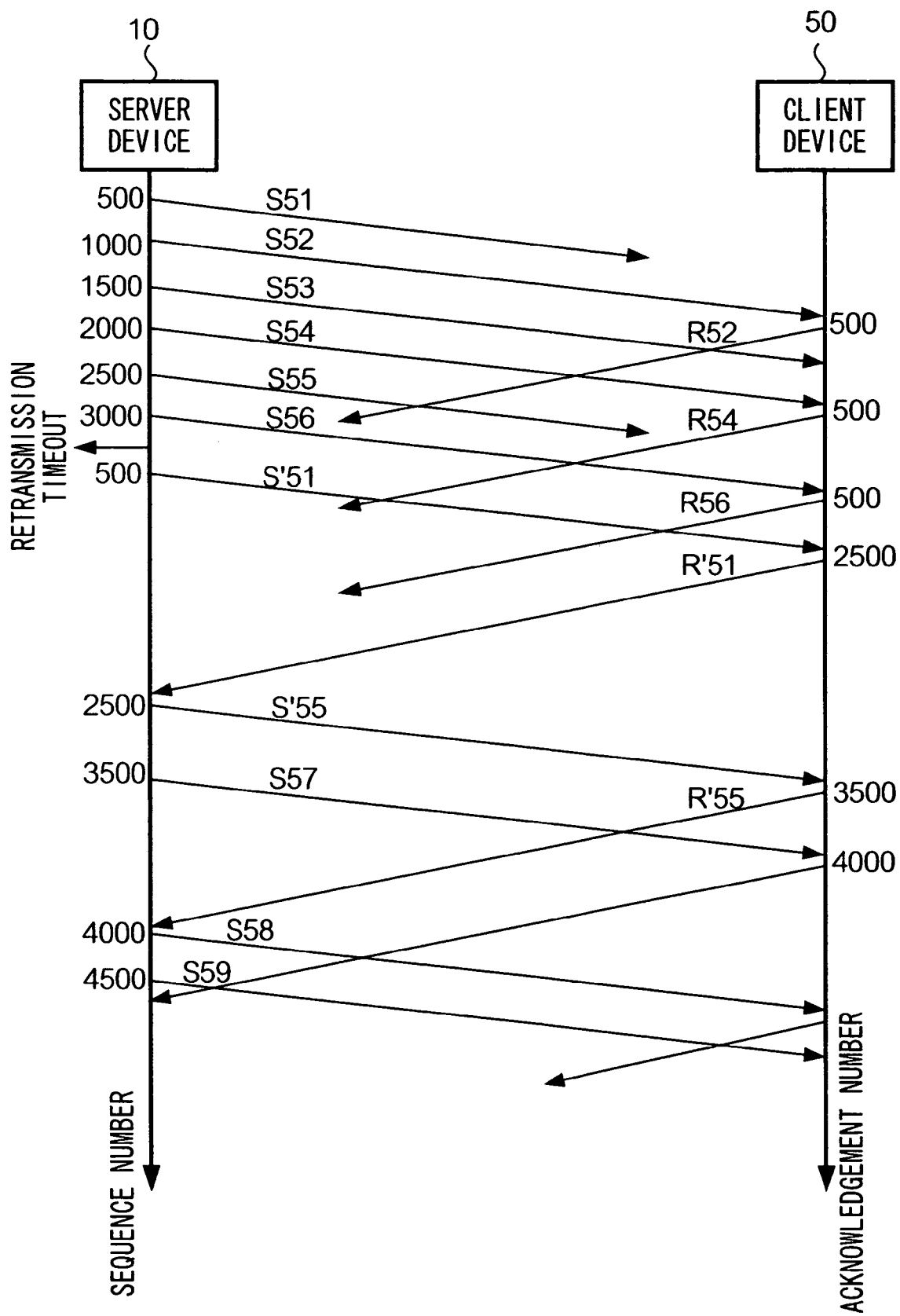
FIG. 14 is a sequence chart illustrating operations of packet communication between server device 10 and client device 50 in accordance with the fourth embodiment.

FIG. 14 is a sequence chart illustrating operations of packet communication between server device 10 and client device 50 in accordance with the second example of the present embodiment.

In the present example, the congestion window size is initially set to 6 MSS. As shown in FIG. 14, server device 10 transmits to client device 50 data segments which have sequence numbers of "500", "1000", "1500", "2000", "2500", and "3000", respectively. Hereinafter, these data segments are referred to as "original data segments" S51-S56, respectively. Here, it is assumed that original data segments S51 and S55 have been lost and have not reached client device 50, and that original data segments S52-S54, and S56 are received by client device 50.

It is assumed here that client device 50 first receives original data segment S52 and a predetermined time has elapsed before client device 50 receives the next data segment. In this case, client device 50 transmits to server device 10 acknowledgement R52 corresponding to original data segment S52 only. Acknowledgement R52 includes an acknowledgement number "500", which indicates a data segment to be received next.

After that, client device 50 receives original data segment S53 and S54, and transmits to server device 10 acknowledgement R54 including an acknowledgment number "500". Subsequently, client device 50 receives only original data segment S56 within a predetermined time, because original data segment S55 has been lost and has not reached client device 50. Client device 50 transmits to server device 10 acknowledgement R56 including an acknowledgment number "500".

In the second example of the present embodiment, it is further assumed that these acknowledgements R52, R54, and R56 have been lost and have not reached sever device 10 because of a deterioration in the wireless communication environment.

Now, description will be given of operations performed by server device 10 described above with reference to FIG. 13.

At step C41, CPU 100 of server device 10 detects a retransmission timeout. CPU 100 updates the value of the congestion window size snd_cwnd to "1 MSS" and retransmits (step C42) to client device 50 a data segment (retransmitted data segment S'51) including a sequence number "500". CPU 100 stores in RAM 102 the value of snd_cwnd and sstresh at a point in time immediately before timeout, namely, "6 MSS" and "65535 bytes", respectively.

Referring again to FIG. 14, when client device 50 receives retransmitted data segment S'51, client device 50 transmits acknowledgement R'51 including an acknowledgment number 2500 which indicates a data segment to be received next.

At step C44, CPU 100 determines whether A is greater than B or not. If A is greater than B, CPU 100 further determines whether A is equal to C or A is equal to B at step C46. In this example of the present embodiment, A, B, and C are 2500, 1500, and 3500, respectively. Therefore, it is determined that A is greater than B and A is not equal to C.

In this case, it is estimated that serious deterioration in the communication environment has occurred, and consequently it is determined that the transmission rate should be reduced. Thus, CPU 100 updates (step C47) the value of the congestion window size snd_cwnd to be less than the value at a point in time immediately before timeout, which is stored in RAM 102. At the point in time, the congestion window size is 3 MSS in this example, the number of data segments which have transmitted and have not received corresponding acknowledgement is two, and therefore the number of data segments which server device 10 can transmit next is one.

Then CPU 100 retransmits a data segment (retransmitted data segment S'55 in FIG. 14) including a sequence number "2500" which is the same as the acknowledgement number included in acknowledgment R'51.

Referring to FIG. 14 again, when client device 50 receives retransmitted data segment S'55, client device 50 transmits acknowledgement R'55 including an acknowledgment number 3500 which indicates a data segment to be received next.

Referring to FIG. 13 again, when server device 10 receives acknowledgement R'55 including an acknowledgement number 3500, it is estimated that all of the transmitted data segments S51-S56, whose maximum sequence number is 3000, have been received by client device 50. Consequently, CPU 100 determines that a data segment to be transmitted next is a data segment including a sequence number 3500. To transmit the subsequent data segments, CPU 100 updates the value of the congestion window size snd_cwnd to be less than the value at a point in time immediately before timeout, stored in RAM 102. For example, the value of snd_cwnd is updated to the half of the stored value. In this example, the value of snd_cwnd is updated from 6 MSS to 3 MSS. Furthermore, CPU 100 updates the value of sstresh from 65535 bytes to 32767 bytes, which is half of the stored value.

CPU 100 then transmits data segments with window size three, namely, CPU 100 transmits three data segments (original data segments S57, S58, and S59 in FIG. 14) including sequence number "3500", "4000", and "4500", respectively.

As described above, in a case that a communication environment is subject to serious deterioration, a transmission rate is controlled to be appropriate, because the value of snd_cwnd and sstresh are updated so as to be less than the value stored at the point in time immediately before timeout.

4-3. Third Example of Operation

Figure 15:
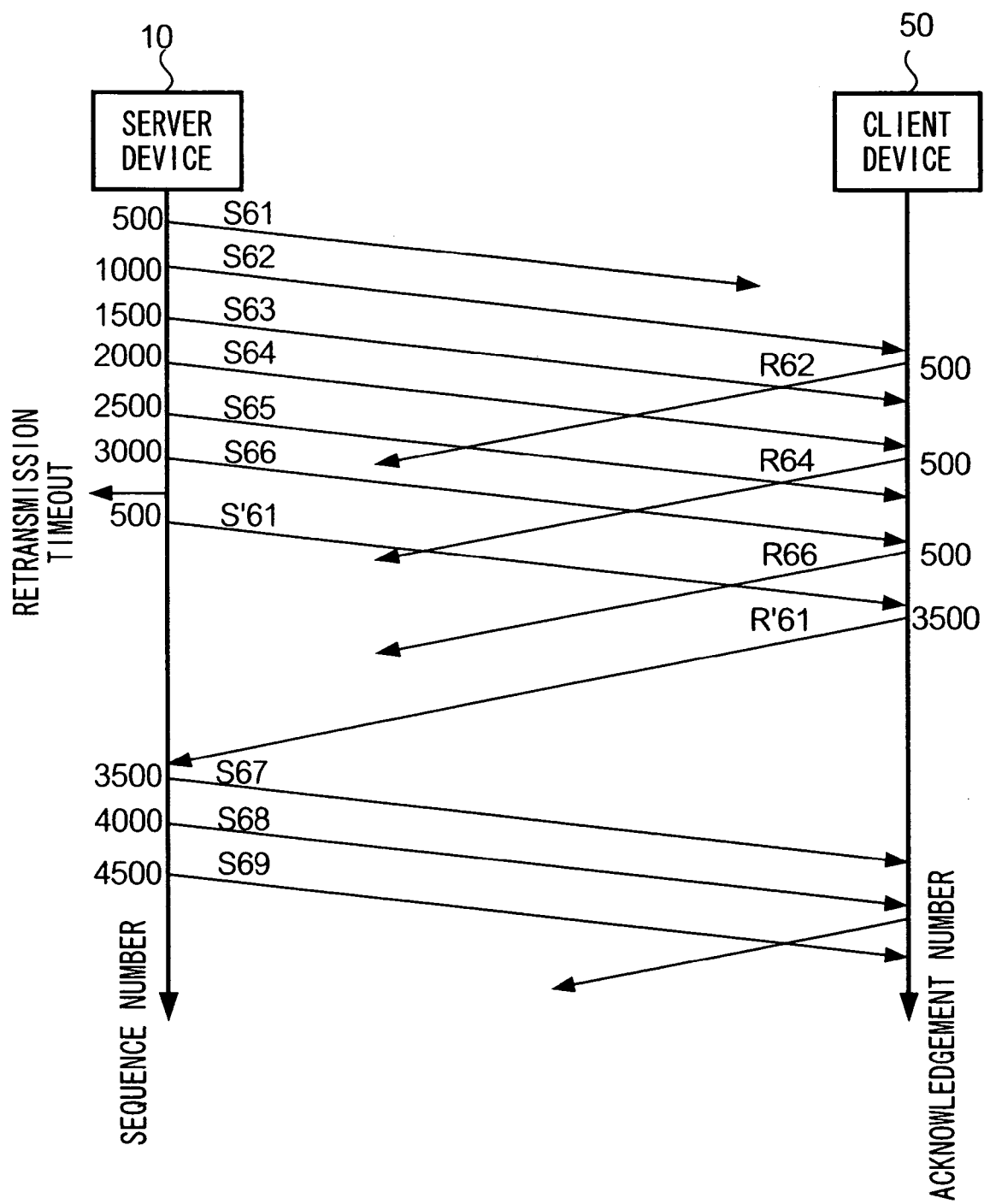
FIG. 15 is a sequence chart illustrating operations of packet communication between server device 10 and client device 50 in accordance with the fourth embodiment.

FIG. 15 is a sequence chart illustrating operations of packet communication between server device 10 and client device 50 in accordance with the third example of the present embodiment.

This example is different from the second example in the following point. Namely, when client device 50 receives retransmitted data segment S'61 including a sequence number "500", client device 50 transmits to server device 10 acknowledgement R'66 including an acknowledgment number "3500". Thus, as a result of the determinations at step C44 and C46, it is determined that serious deterioration in a communication environment has occurred, similar to the second example described above, and consequently it is determined that the transmission rate should be reduced.

In this example, CPU 100 of server device 10 does not retransmit a data segment but rather transmits a data segment including a sequence number "3500", subsequent to data segment S66. To transmit the data segment, CPU 100 updates the value of the congestion window size snd_cwnd and the threshold sstresh to be less than the value at the point in time immediately before timeout, stored in RAM 102. For example, the value is updated to be half that of the stored value. Namely, the value of snd_cwnd is updated from "6 MSS" to "3 MSS". CPU 100 then transmits three data segments (original data segments S67, S68, and S69 in FIG. 15) including sequence numbers "3500", "4000", and "4500", respectively.

In the invention according to the embodiment described above, it is not necessary to add information such as a time stamp option to a data segment or acknowledgement. Moreover, it is not necessary for server device 10 or client device 50 to make any substantial system change. It is also possible to use an existing personal computer or a mobile phone as client device 50. Thus, the present invention provides to a user an appropriate communication rate.

5. Modifications

The present invention is not restricted to the embodiments described above, and it will be apparent to those skilled in the art that various modifications are available without departing from the spirit and scope of the invention set out in the embodiments.

In the above embodiments, while packet communication is described with reference to TCP, the invention, as defined in the embodiments, is not limited to use under TCP, and other communication protocols can be used for the packet communication.

In the above embodiments, client device 50 communicates with server device 10 via communication terminal 40. The configuration of the communication system is not restricted to that described, and Client device 50 may utilize wireless communication, and may therefore communicate with server device 10 without communication terminal 40.

After fast retransmission, server device 10 may transmit a data segment subsequent to a data segment including the maximum sequence number within data segments which have already transmitted, in accordance with a fast recovery algorithm. In this case, server device 10 updates the value of the congestion window size snd_cwnd and the threshold sstresh when server device 10 receives an acknowledgement including an acknowledgement number which is next to a data segment including the maximum sequence number within data segments which have been already transmitted.

The invention claimed is:

1. A communication device comprising:
   transmission means for transmitting a plurality of data segments to a destination device via a packet communication network, each of the plurality of data segments including a sequence number, the plurality of data segments being transmitted in sequence number order;
   receiving means for receiving an acknowledgement indicating a data segment to be received next;
   retransmission means for changing a transmission rate, and for retransmitting one of the plurality of data segments in a case that the communication device has not received an acknowledgement including an acknowledgement number greater than a sequence number included in the one of the plurality of data segments when a predetermined time elapses following transmission of the one of the plurality of data segments by the transmission means;

control means for determining a subsequent data segment to be transmitted next, and for controlling a transmission rate on the basis of a category of the acknowledgement and information included in the acknowledgement, to transmit the subsequent data segment.

2. A communication device according to claim 1, wherein:

the retransmission means retransmits again, after the one of the plurality of data segments has been retransmitted, the one of the plurality of data segments when the receiving means receives a predetermined number of acknowledgements, all of which include the same acknowledgement number; and the control means updates the transmission rate on the basis of a transmission rate at a point in time immediately before the predetermined time elapses, in a case that the receiving means receives an acknowledgement including an acknowledgement number subsequent to a maximum sequence number included in data segments which have already been transmitted.

3. A communication device according to claim 1, wherein:

the retransmission means retransmits again the one of the plurality of data segments when the receiving means receives a predetermined number of selective acknowledgements, all of which include the same acknowledgement number after the one of the plurality of data segments has been retransmitted, the selective acknowledgement further including selective acknowledgment information for identifying received data segments, the one of the plurality of data segments being identified by the selective acknowledgment information; and the control means updates the transmission rate on the basis of a transmission rate at a point in time immediately before the predetermined time elapses, in a case that the receiving means receives an acknowledgement including an acknowledgement number subsequent to a maximum sequence number included in data segments which have already been transmitted.

4. A communication device according to claim 1, wherein:

the control means updates the transmission rate on the basis of a transmission rate at a point in time immediately before the predetermined time elapses, in a case that the receiving means receives an acknowledgement including an acknowledgement number equal to a sequence number which is a predetermined number greater than a sequence number included in the one of the plurality of data segments retransmitted by the retransmission means.

5. A communication device according to claim 1, wherein:

the retransmission means retransmits again the one of the plurality of data segments, in a case that the receiving means receives an acknowledgement including an acknowledgement number greater than a sequence number which is a predetermined number greater than a sequence number included in the one of the plurality of data segments retransmitted by the retransmission means; and the control means updates the transmission rate to be less than a transmission rate at a point in time immediately before the predetermined time elapses, in a case that the receiving means receives an acknowledgement including an acknowledgement number subsequent to a maximum sequence number included in data segments which have already been transmitted.

6. A communication device according to claim 1, wherein:

the control means updates the transmission rate to be less than a transmission rate at a point in time immediately before the predetermined time elapses, in a case that the receiving means receives an acknowledgement including an acknowledgement number equal to a sequence number which is a predetermined number greater than a sequence number included in the one of the plurality of data segments retransmitted by the retransmission means.

7. A transmission control method, comprising the steps of:

transmitting a plurality of data segments to a destination device via packet communication network, each of the plurality of data segments including a sequence number, the plurality of data segments being transmitted in sequence number order;

receiving an acknowledgement indicating a data segment to be received next;

changing a transmission rate, and retransmitting one of the plurality of data segments in a case that the communication device has not received an acknowledgement including an acknowledgement number greater than a sequence number included in the one of the plurality of data segments when a predetermined time has elapses following transmission of the one of the plurality of data segments in the transmitting step;

determining a subsequent data segment to be transmitted next; and controlling the transmission rate on the basis of a category of the acknowledgement and information included in the acknowledgement, to transmit the subsequent data segment.

8. A computer readable storage medium storing a program causing a computer to execute a process, the process comprising:

transmitting a plurality of data segments to a destination device via a packet communication network, each of the plurality of data segments including a sequence number, the plurality of data segments being transmitted in sequence number order;

receiving an acknowledgement indicating a data segment to be received next;

changing a transmission rate and of retransmitting one of the plurality of data segments in a case that the communication device has not received an acknowledgement including an acknowledgement number being greater than a sequence number included in the one of the plurality of data segments when a predetermined time elapses following transmission of the one of the plurality of data segments in the transmitting step;

determining a subsequent data segment to be transmitted next, and for controlling the transmission rate on the basis of a category of the acknowledgement and information included in the acknowledgement, to transmit the subsequent data segment.

* * * * *

UNITED STATES PATENT AND TRADEMARK OFFICE
CERTIFICATE OF CORRECTION

| | |
|---|---|
| PATENT NO. | : 7,296,206 B2 |
| APPLICATION NO. | : 10/807,505 |
| DATED | : November 13, 2007 |
| INVENTOR(S) | : Motoharu Miyake et al. |

Page 1 of 1

It is certified that error appears in the above-identified patent and that said Letters Patent is hereby corrected as shown below:

On the Title page, item [57]

In column 2, line 9, under "ABSTRACT", after "transmission rate and" delete "fro" and substitute --for-- in its place.

Column 20, in claim 7, line 15, before "elapses following transmission" delete "has".

Signed and Sealed this

Thirteenth Day of May, 2008

JON W. DUDAS
*Director of the United States Patent and Trademark Office*